Patented June 17, 1941

2,245,780

UNITED STATES PATENT OFFICE 2,245,780

ACID WOOL DYESTUFFS

Ernst Heinrich, Frankfort-on-the-Main-Fechenheim, Germany, assignor to General Aniline & Film Corporation, New York, N. Y., a corporation of Delaware No Drawing. Application November 13, 1939, Serial No. 304,171. In Germany September 30, 1938

4 Claims. (Cl. 260—372)

My present invention relates to valuable acid wool dyestuffs more particularly to those of the general formula:

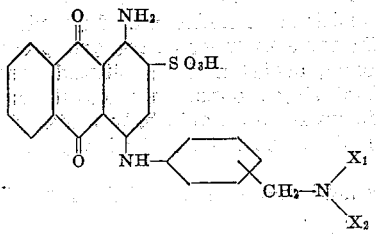

in which formula $X_1$ stands for a member of the group consisting of hydrogen, alkyl, phenyl and benzyl, $X_2$ for a member of the group consisting of hydrogen, acetyl and substituted acetyl, which dyestuffs dye the animal fibers from an acid bath bluish shades of a remarkable fastness to light and of a good levelling power. The present new dyestuffs are obtainable by condensing 1-amino-4-halogenanthraquinone-2-sulfonic acids with amino compounds of the general formula:

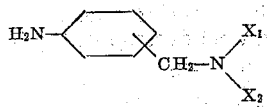

wherein $X_1$ and $X_2$ have the aforesaid signification.

The dyestuffs, which correspond to the aforesaid general formula, $X_2$ standing for hydrogen, are for instance in a simple manner obtainable by carrying out the aforesaid condensation while using amino compounds containing the acetyl group and splitting off the acetyl group from the molecule of the condensation products by a subsequent treatment with saponifying agents.

Moreover the present dyestuffs are obtainable by using as the one reaction component 1-amino-2.4-dihalogenoanthraquinones and replacing in the molecule of the condensation products the halogen atom standing in the 2-position of the anthraquinone nucleus by the sulfonic acid group by means of sulfite.

In order to further illustrate my invention the following examples are given, the parts being by weight and all temperatures in degrees centigrade.

Example 1

To a solution of 40 parts of 1-amino-4-bromanthraquinone-2-sulfonic acid in about 4000 parts of water, 50 parts of the sulfate of 4-aminobenzyl-acetamide (colorless leaflets of 214/215° melting point), 84 parts of sodium bicarbonate and 4 parts of cuprous chloride are added. The mixture is heated for some hours at 90 to 95°, then the formed dyestuff is isolated. It corresponds to the formula:

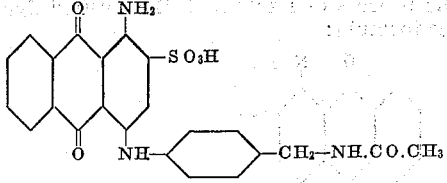

It is when dry a dark blue powder soluble in concentrated sulfuric acid with a bluish green color, turning to yellowish green after the addition of paraformaldehyde.

It dyes wool from an acid bath clear reddish blue shades of a good fastness to light and of a good levelling power.

Example 2

A suspension of 30 parts of the dyestuff of Example 1 in about 800 parts of alcohol is heated to boiling for about 8 hours while introducing hydrochloric acid gas. A temporary solution occurs; then there begins the separation of the hydrochloride of the dyestuff of the formula:

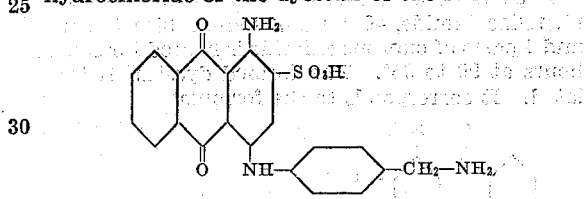

The reaction product is filtered off while hot and washed out with salt water. Advantageously it is transformed into the sodium salt by salting it out from an aqueous sodium carbonate alkaline solution. The dyestuff is very similar in its properties to that of Example 1. It dyes wool likewise clear reddish blue shades of a somewhat more greenish tint than the dyestuff of Example 1.

Example 3

To a solution of 40 parts of 1-amino-4-bromanthraquinone-2-sulfonic acid in about 4000 parts of water, 27 parts of 3-aminobenzyl-methyl-acetamide, 40 parts of sodium bicarbonate and 4 parts of cuprous chloride are added. The mixture is heated for some hours at 90 to 95° and the formed dyestuff of the formula:

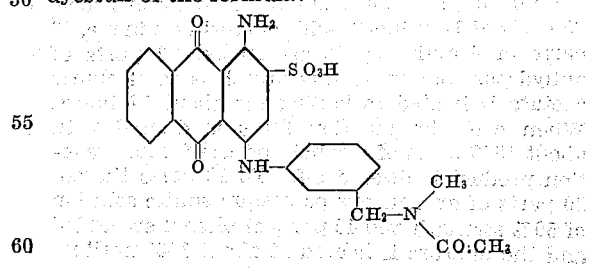

is isolated. It is very similar in its properties with the dyestuffs of Examples 1 and 2.

Similar dyestuffs are obtained by replacing the 3 - aminobenzyl-methylacetamide by 3 - amino - benzyl-ethylacetamide or the corresponding 2- or 4-amino compounds.

When subjecting the latter dyestuff of the formula:

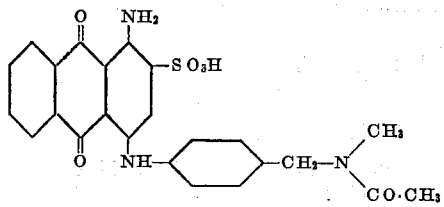

to the process of Example 2 the formed dyestuff of the formula:

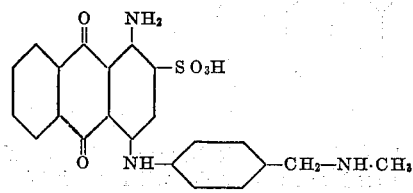

dyes wool likewise valuable reddish blue shades.

Similar dyestuffs are obtained while using as one reaction component 2, 3 or 4-aminobenzyl-methyl-methoxyacetamide of the formula:

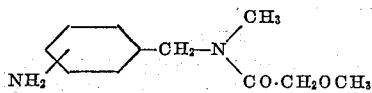

*Example 4*

A mixture of a solution of 40 parts of 1-amino-4-bromanthraquinone-2-sulfonic acid in about 4000 parts of water, 35 parts of 4-aminobenzyl-phenylacetamide, 40 parts of sodium bicarbonate and 4 parts of cuprous chloride is heated for some hours at 90 to 95°. The formed dyestuff is isolated. It corresponds to the formula:

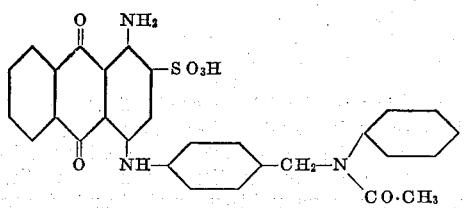

and dyes wool greenish blue shades of a good fastness to light and of a good levelling power.

When using as the one reaction component 4-amino-dibenzylacetamide of the formula:

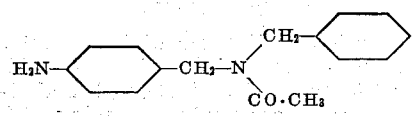

a very similar dyestuff is obtained.

*Example 5*

A mixture of about 200 parts of chlorobenzene, 20 parts of 1-amino-2.4-dibromanthraquinone, 40 parts of 4-aminobenzyl-acetamide, 20 parts of anhydrous sodium acetate and 2 parts of cupric acetate is heated to boiling for about 12 hours. When cool the reaction mass is diluted with about 1000 parts of alcohol and the formed reaction product is filtered off. To 10 parts thereof 20 parts of an aqueous potassium sulfite solution of 50% strength and 40 parts of phenol are added and the mixture is heated at about 140° until no more water soluble dyestuff is formed. Then the phenol is removed by steam distillation and the formed dyestuff which is identical in its tinctorial behaviour with the dyestuff of Example 1 is isolated.

I claim:

1. Acid wool dyestuffs of the general formula:

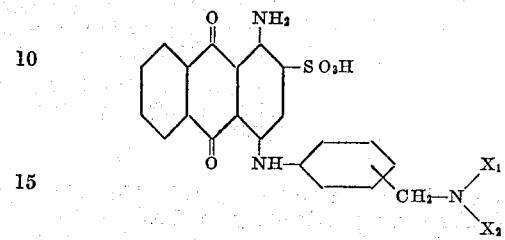

in which formula $X_1$ stands for a member of the group consisting of hydrogen, alkyl, phenyl and benzyl, $X_2$ for a member of the group consisting of hydrogen, acetyl and substituted acetyl free from solubilizing groups, which dyestuffs dye the animal fibers from an acid bath bluish shades of a good fastness to light and of a good levelling power.

2. The acid wool dyestuff of the formula:

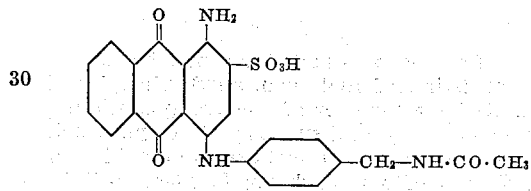

which dyestuff is when dry a dark blue powder soluble in concentrated sulfuric acid with a bluish green color, turning to yellowish green after the addition of paraformaldehyde and dyes wool from an acid bath clear reddish blue shades of a good fastness to light and of a good levelling power.

3. The acid wool dyestuff of the formula:

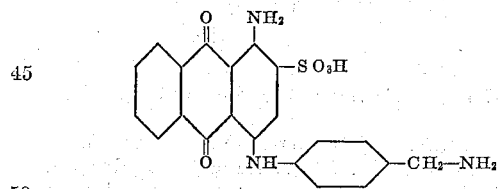

which dyestuff is when dry a dark blue powder soluble in concentrated sulfuric acid with a bluish green color, turning to yellowish green after the addition of paraformaldehyde and dyes wool from an acid bath clear reddish blue shades of a good fastness to light and of a good levelling power.

4. The acid wool dyestuff of the formula:

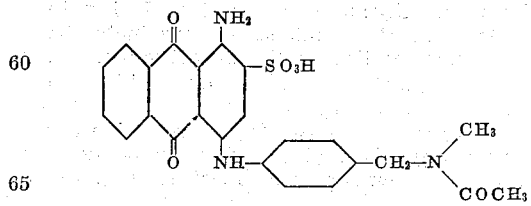

which dyestuff is when dry a dark blue powder soluble in concentrated sulfuric acid with a bluish green color, turning to yellowish green after the addition of paraformaldehyde and dyes wool from an acid bath clear reddish blue shades of a good fastness to light and of a good levelling power.

ERNST HEINRICH.